(12) United States Patent
Bray et al.

(10) Patent No.: US 7,705,610 B2
(45) Date of Patent: *Apr. 27, 2010

(54) APPARATUSES AND METHODS FOR NONDESTRUCTIVE MICROWAVE MEASUREMENT OF DRY AND WET FILM THICKNESS

(75) Inventors: Alan V. Bray, Spicewood, TX (US);
Claude H. Garrett, Austin, TX (US);
Christian J. Corley, Austin, TX (US)

(73) Assignee: System & Material Research Corporation, Spicewood, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/041,470

(22) Filed: Mar. 3, 2008

(65) Prior Publication Data
US 2009/0066344 A1 Mar. 12, 2009

Related U.S. Application Data

(62) Division of application No. 11/271,461, filed on Nov. 10, 2005, now Pat. No. 7,339,382.

(60) Provisional application No. 60/626,971, filed on Nov. 11, 2004.

(51) Int. Cl.
*G01R 27/04* (2006.01)
*G01R 27/32* (2006.01)

(52) U.S. Cl. .................................. 324/644; 324/637

(58) Field of Classification Search ................ 324/637, 324/644
See application file for complete search history.

(56) References Cited

U.S. PATENT DOCUMENTS

| | | | |
|---|---|---|---|
| 4,045,727 A | 8/1977 | Yu et al. | |
| 4,702,931 A | 10/1987 | Falcoff | |
| 5,038,615 A | 8/1991 | Trulson et al. | |
| 5,103,182 A * | 4/1992 | Moslehi | 324/642 |
| 5,539,322 A | 7/1996 | Zoughi et al. | |

(Continued)

OTHER PUBLICATIONS

Qaddoumi, et al., "Microwave Detection and Depth Determination of Disbonds in Low-Permittivity and Low-Loss Thick Sandwich Composites," 1996, 8:51-63, Springer-Verlag NY Inc.

*Primary Examiner*—Amy He
(74) *Attorney, Agent, or Firm*—Scheinberg & Griner, LLP; David Griner; Robert McMinn

(57) ABSTRACT

Wet and dry film thickness can be measured non-invasively on structures, such as surfaces associated with vessels, aircraft and buildings, using calibrated microwave sensors. The film is measured by directing microwave energy toward the film. The microwave energy passes through the film and is reflected by a reflective or semi-reflective substrate surface below the film. Properties of the reflected wave are compared with properties of reflected waves that were passed through calibration samples of known thicknesses to determine the unknown thickness of the film. In some embodiments, one or more sensors are maintained at a fixed altitude above the conductive/semi-conductive substrate for measurement, and in other embodiments, one or more sensors are maintained at a fixed altitude above the film. In one embodiment, sensors are associated with a coating applicator, with a first sensor preceding the applicator and a second sensor following the applicator to measure the thickness of the film applied by the applicator by comparing measurements before and after coating.

19 Claims, 10 Drawing Sheets

U.S. PATENT DOCUMENTS

| | | |
|---|---|---|
| 5,748,003 A | 5/1998 | Zoughi et al. |
| 6,005,397 A | 12/1999 | Zoughi et al. |
| 6,120,833 A | 9/2000 | Bonnebat et al. |
| 6,317,651 B1 | 11/2001 | Gerstenberger et al. |
| 6,462,561 B1 | 10/2002 | Bigelow et al. |
| 6,489,741 B1 | 12/2002 | Benov et al. |
| 6,522,285 B2 | 2/2003 | Stolarczyk et al. |
| 6,674,292 B2 | 1/2004 | Bray et al. |

\* cited by examiner

Example Zigzag Trajectory

APPARATUSES AND METHODS FOR NONDESTRUCTIVE MICROWAVE MEASUREMENT OF DRY AND WET FILM THICKNESS

This application is a Divisional of U.S. patent application Ser. No. 11/271,461, which was filed Nov. 10, 2005, and which claimed priority from U.S. Provisional Patent Application No. 60/626,971, filed Nov. 11, 2004, both of which are hereby incorporated by reference.

STATEMENT REGARDING FEDERALLY SPONSORED RESEARCH OR DEVELOPMENT

This invention was made with Government support and the Government has certain rights in the invention.

TECHNICAL FIELD OF THE INVENTION

The present invention relates to dry and wet film thickness measurements, such as paints and appliqués, using microwaves.

BACKGROUND OF THE INVENTION

Coatings are used in a wide variety of applications to protect underlying structures from their environments. For example, coatings can be used to resist corrosion, to provide thermal insulation, to prevent mechanical damage, to reduce radar observability, or to protect from lightning strikes. Coatings include, for example, paint and polymer-based appliqués, which are being considered by military and commercial aviation operators as an alternative to paint.

For quality control, process monitoring, and cost control, it is desirable to have a method of non-destructive evaluation (NDE) of coating thickness during manufacturing. Preferably, the coating thickness could be accurately measured after it dries or while still wet, so that the coating application can be adjusted in real time to control the process. It is also desirable to be able to rapidly and accurately measure coating thicknesses in the field. Particularly in critical applications, such as to measure the thickness of hi-tech coatings used in aircraft and spacecraft, fast, accurate measurements are critical. Hi-tech coating, such as low observable coatings used in stealth aircraft, can be very expensive. An extra few thousands of an inch of unnecessary coating thickness can add significant expense to the manufacturing process for an aircraft part. Excess paint can also mean unnecessary added weight, and when a lightning strike layer is present, increased lightning hit probability.

One method used in the automotive industry to measure paint coating thickness entails the use of magnetic fields to determine the total thickness of paint on a steel substrate. This method is limited to measuring the thickness of coatings on metallic surfaces. Ultrasonic measurement can be used to determine thicknesses of coating materials by transmitting high frequency sound pulses through the material, receiving echo pulses reflected from the substrate surface and interface layers, and measuring the time between pulses. An ultrasonic technique described by U.S. Pat. No. 4,702,931 for Falcoff is limited to measuring the thickness of wet paint. Ultrasonic measurements, such as the technique described in U.S. Pat. No. 5,038,615 to Trulson, et al. for "Ultrasonic Multilayer Paint Thickness Measurement" typically require a liquid couplant, and measurement are limited in thick and coarse grained materials because of the high attenuation of the ultrasonic signal. Ultrasonic techniques typically lack sufficient accuracy for modern applications, such as low observable coatings, lightning strike grids, and metal oxide hull paints.

U.S. Pat. No. 6,120,833 to Bonnebat et al. for "Method And Device For Measuring The Thickness Of An Insulating Coating" describes a method for measuring paint thickness that entails using an inductive measuring technique, along with a second technique, such as an optical or capacitive technique. The method of Bonnebat et al. requires measuring the substrate both before and after coating, and such before-coating measurements are not always available.

Microwaves can be used to penetrate paint and other dielectric coatings to detect corrosion beneath the coating, as described in U.S. Pat. No. 6,674,292 to Bray et al. for "Microwave Corrosion Detection Systems and Methods," which is hereby incorporated by reference. Bray et al. describes directing relatively low power microwaves toward a coated substrate and measuring the reflected wave to determine the presence of corrosion under the coating. Bray et al. does not teach measuring thickness of the coating.

N. Qaddoumi et al. in "Microwave Detection and Depth Determination of Disbonds in Low-Permittivity and Low-Loss Thick Sandwich Composites," *Research in Nondestructive Evaluation,* 8:51-63 (1996) describes locating defects in a multilayer composite material by directing microwaves toward the material and measuring the phase of the reflected microwave. By varying the frequency and the standoff distance of the microwave transmitter, the phase of the reflected wave can identify characteristics of a defect in a specific layer. Calibration samples are fabricated by creating defects at different locations in each of the layers and measuring the phase of the wave reflected from each of the defects. When measuring an actual product, one can match the phase of the reflected wave to the calibration data to determine which layer, if any, is defective.

U.S. Pat. No. 5,748,003 to Zhoughi for "Microwaves Used for Determining Fatigue and Surface Crack Features on Metal Surface" teaches using microwaves to determine crack geometry under a paint layer. U.S. Pat. No. 5,539,322 to Zhoughi for "Calibrated Microwave Dielectric Coating Thickness Gauge" describes a method using microwaves to determine whether an automobile has been repainted by determining the number of paint coatings that have been applied. By comparing the output voltage of a microwave detector with the known output of typical paint layers, the detector can determine the number of paint layers. The method is useful for only a limited number and thickness of coatings, because the measured voltage has a one-to-one correspondence to layer thickness over only a limited range. Because the goal is to determine whether the automobile has been repainted, limited range and accuracy is acceptable.

U.S. Pat. No. 6,005,397 to Zhoughi for "Microwave Thickness Measurement and Apparatus," describes a method for measuring the thickness of rubber covering steel belts of a tire during a tire retreading process. A series of crystal detectors are mounted along a waveguide to measure a standing wave. By measuring the voltage at multiple points, the amplitude and phase of the standing wave can be calculated. The patent teaches determining the thickness from the standing wave based on a mathematical model, which derives reflected wave amplitude and phase using assumptions about the electrical properties of the coating and the resulting signals. The air gap is preferably selected so that the phase changes sign when the rubber layer approaches the desired thickness, thereby alerting operators to stop the buffing process when the phase changes and the desired thickness is reached. The method requires multiple sensors in different physical locations to characterize the standing wave, and the characterization depends on knowing the exact location of the each of the multiple sensors.

SUMMARY OF THE INVENTION

An object of the invention is to provide non-destructive dry and wet film thickness measurements.

This invention comprises a method and apparatus that directs microwaves toward a structure and measures one or more properties of the reflected wave to determine the thickness of a film on the structure. The thickness is determined from properties of a reflected wave, which properties are influenced by the thickness and dielectric properties of film.

Preferred embodiments of the invention use calibration films of known thickness to derive calibration data and then compare the measurements of a test film of unknown thickness with the calibration data to determine the thickness of the test film. Some embodiments are capable of measuring both wet film thickness and dry film thickness. Some embodiments are capable of measuring thicknesses over a broad range. Some embodiments measure the quadrature components of the reflected wave from wet and dry films and correlate thickness to those quadrature components or to a property, such as phase angle, derived of those quadrature components.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which:

FIG. 17 shows a typical zigzag trajectory of the;

DETAILED DESCRIPTION OF PREFERRED EMBODIMENTS

Figure 1:
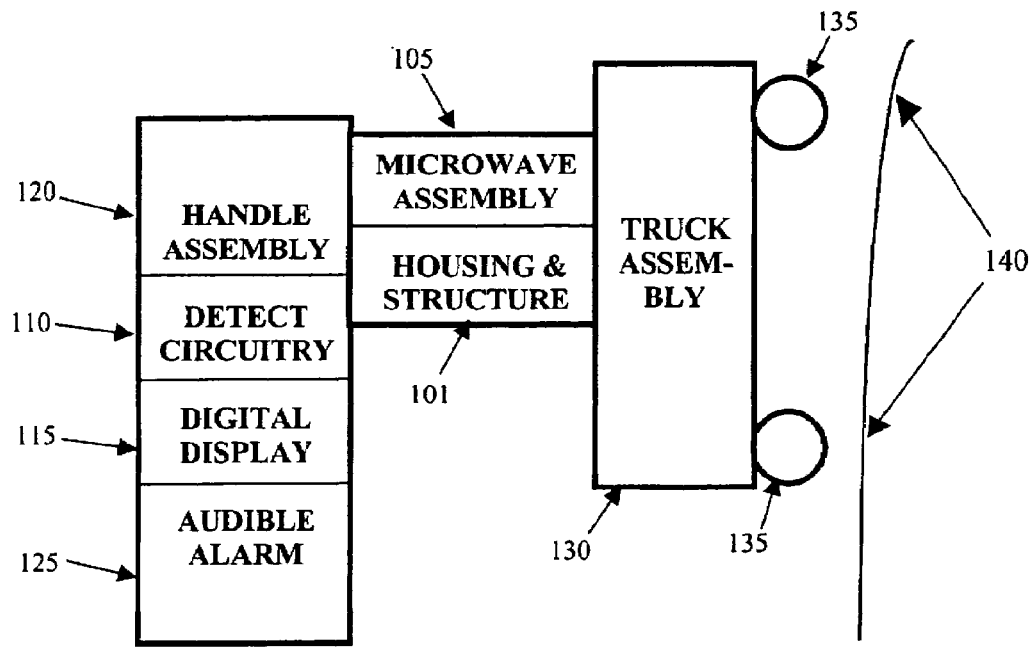
FIG. 1 illustrates a block diagram of a microwave thickness measurement tool in accordance with embodiment of the present invention.

Preferred embodiments of the invention use microwaves to provide for non-destructive measurement of dry film thickness (DFT) and wet film thicknesses (WFT) on the surfaces of structures, such as surfaces associated with vessels, aircraft, and buildings. The terms "film," "coating," and "layer" are used interchangeably herein to mean any coating deposited on the surface of a structure. Microwave energy is directed from a microwave source toward a film, such as paint or appliqué, over a target substrate. A portion of the microwave energy is reflected from the target surface underneath the film to be measured. The thickness and dielectric properties of the film through which the microwaves pass affect the properties of the microwaves. The reflected microwaves combine with the primary waves to form a standing wave pattern. Preferred embodiments determine the quadrature components of a reflected wave, which quadrature components are then correlated to film thickness, preferably using correlation data determined from calibration standards.

A set of wet and dry calibration standards is prepared by coating various thicknesses of the film material to be measured over test substrates. The thickness of the films on the wet calibration standards can be controlled using drawdown knives. The film thicknesses of the calibration standards preferably cover the thickness range of interest in the measurements. The film thicknesses of the calibration standards can be accurately determined using, for example, a wet film cam gauge. The number of calibration standards and thickness values of the calibration standards within a set will vary with the type of material and the accuracy required of the measurements. Because different coatings having different dielectric properties and different structural materials have different microwave reflectivity, depending on the composition and surface roughness, the best accuracy is achieved by producing a set of calibration standards for each different type of film and underlying structural material to be measured. Skilled persons can readily determine the necessary make-up of a set of calibration standards. For example, in a typical thick coating application, samples are prepared within the 0 to 50 mil range in 3 to 4 mil increments.

In some embodiments, wet film samples are measured in 1 mil increments, or even in 0.25 to 0.5 mil increments.

After a set of calibration standards is prepared, the calibration standards are measured by using the microwave measurement techniques described herein, to prepare a ground truth table and/or a derived interpolation function to correlate microwave readings to film thickness. The microwave is a Doppler capable sensor and the measurement typically includes the in-phase (I) and quadrature (Q) components which can be used to determine, as an example, phase angle (Arctan Q/I) and magnitude $((Q^2+I^2)^{1/2})$. Because the reflected wave properties depend not only on the film properties, but also on the stand off distance, that is, the distance from the microwave transmitter to the substructure, calibration data correlating microwave readings to film thickness are typically determined for a specific stand off distance which can range from 0.1 inch for K band sensors to 2 or more inches for X band sensors used in wet film measurements. The term "stand off" is used herein sometimes to refer to the distance to the underlying structure and sometimes to refer to the distance to the top surface of the coating. The meaning in each case will be clear from the context. Thus, a library of calibration data is compiled for different films, underlying structural materials, and stand off distances. For wet film thickness measurements, the range of characterized standoff distances preferable includes stand off distances sufficiently great, preferably up to about six inches, to cover microwave sensors attached to automatic coating machines.

The correlation data are stored and compared to the data obtained during a coating thickness measurement, and the coating thickness is computed by comparison of the measurement with the calibration function and/or data. By using calibration standards made from the same material as the film to be measured and coated over the same target material to determine an empirical relationship between the microwave measurements and thickness, these embodiments do not rely as heavily on assumptions about the position of sensors or about the physical properties of the film and are more accurate than prior art methods that exclusively use mathematical models based on a specific function of the reflected signal.

The relationship between the film thickness and the microwave measurement can be compiled into a ground truth table and/or a derived interpolation function, such as a damped sine wave, a parabola, or a spiral. An interpolation function is a mathematical relationship based on the calibration data and provides values for thickness from the measured parameters. These calibration data are then stored and compared to the measured microwave data obtained during a WFT and/or DFT measurement to determine the film thickness. For example, in one embodiment, the thickness of the calibration standards is plotted against the amplitude of the in-phase component of the reflected wave on one axis and the quadrature component of the reflected wave on the other axis. The plot, in some embodiments, approximates the shape of an eccentric spiral. The in-phase and quadrature components of the reflected wave are measured for a work piece having a film of unknown thickness, and the in-phase and quadrature components are then plotted to determine the closet point on the calibration curve to determine the actual film thickness. The calibration curve need not be defined by a single mathematical expression for all regions; different curves can be used to fit different parts of the data. For a given sample type there is a unique I and Q combination corresponding to each film thickness.

In one type of preferred embodiment, one or more sensors are maintained at fixed altitudes above a conductive or semiconductive substrate. That is, rather than being at a fixed distance above the coating, the sensors are maintained at a fixed distance from the underlying substrate. The film thickness is derived from the change in the reflected wave caused by the thickness of the wet or dry film. In a second type of embodiment, one or more sensors are maintained at a fixed altitude above the exposed surface of the film, rather than the surface of the substrate. In both cases the change in the reflected wave caused by the coating or coatings is used to derive the film thickness.

In one embodiment of the first type, described in greater detail below, two sensors are mounted on a coating applicator, such as a paint sprayer, one sensor being positioned to measure a surface before the coating is applied, and a second sensor being mounted to measure after the coating is applied. The measurements are compared to derive the thickness of the coating that was applied between the measurements. The speed of the coating applicator is preferably sufficiently fast that the applied coating does not dry to any significant extent between the application and the measurement. The coating applicator system accurately maintains a fixed distance from the structure being painted, for example, by using computer-aided engineering data about the structure. This implementation can measure a WFT, regardless of whether the wet film is applied directly on the substrate or over one or more layers of existing film. The resulting function of the two sensor outputs can provide feedback for a robotic paint or coating applications system, and can be used to control speed of advance of the painting robot end effector, the volume rate of spray, or spray head altitude, to insure the correct WFT for the application.

In an embodiment of the second type, the sensor is maintained at a fixed altitude, typically above a dry film surface. For example, the sensor may be mounted on a platform that rests on the dry film to maintain the sensor at a known standoff distance from the film. A calibration method, described below, uses the standard outputs of a low power microwave motion detector and extends the measurement range to over 5 cycles of the standing wave pattern, providing a very thick DFT measurement capability, e.g., approximately 0.5 inches using a K band transceiver.

Description of Hardware of One Embodiment

One embodiment of hardware that can be used to generate the microwaves and measure the reflected wave is similar to the Microwave Corrosion Detector ("MCD") described in U.S. patent application Ser No. 6,674,292 by one of the applicants of the present application. This embodiment comprises a hand-held portable device which can measure thickness of dielectric coatings on conductive or partially conductive structures. The device can be scanned, for example, over an aircraft surface while being held by one hand. Thickness can be displayed and recorded, and/or visual alarms can be used to indicate whether a thickness value falls outside a specified range.

A preferred embodiment of a Microwave Thickness Detector ("MTD") inspection tool 100 is illustrated in the block diagram of FIG. 1. A microwave assembly 105 includes detection circuitry 110 and display(s) 115, which can be integrated into a handle 120 integrated with the inspection tool 100. The handle 120 can also house an audible alarm 125. With the illustrated configuration, the microwave assembly 105 can generally be in a bridging structure between an optional truck assembly 130 and the handle assembly 120. This can include a housing 101 to protect and shield the microwave assembly 105 and a structural interface strong enough to be a rigid connection for the entire tool assembly.

Housing 101 for the MTD tool 100 can take many portable forms. Those skilled in the art can appreciate that a MTD tool 100 can be provided in a radar-gun-like structure, radiation monitoring unit configuration, or can also take the form of metal-detector units. The system can also optionally include a truck assembly 130. The truck assembly 130 would provide two major functions: (1) enable easy, well balanced, scanning motion and; (2) keep the microwave sensor within a specified distance of the target surface 140 being measured. Multiple rollers 135 can be provided with the truck assembly 130 to provide both distance and ease of use in scanning over targets surfaces. Some target surface contours may require changing the truck assembly 130. For example, an inside corner inspection of a target can be accomplished by utilizing a wedge shaped truck assembly 130.

Figure 2:
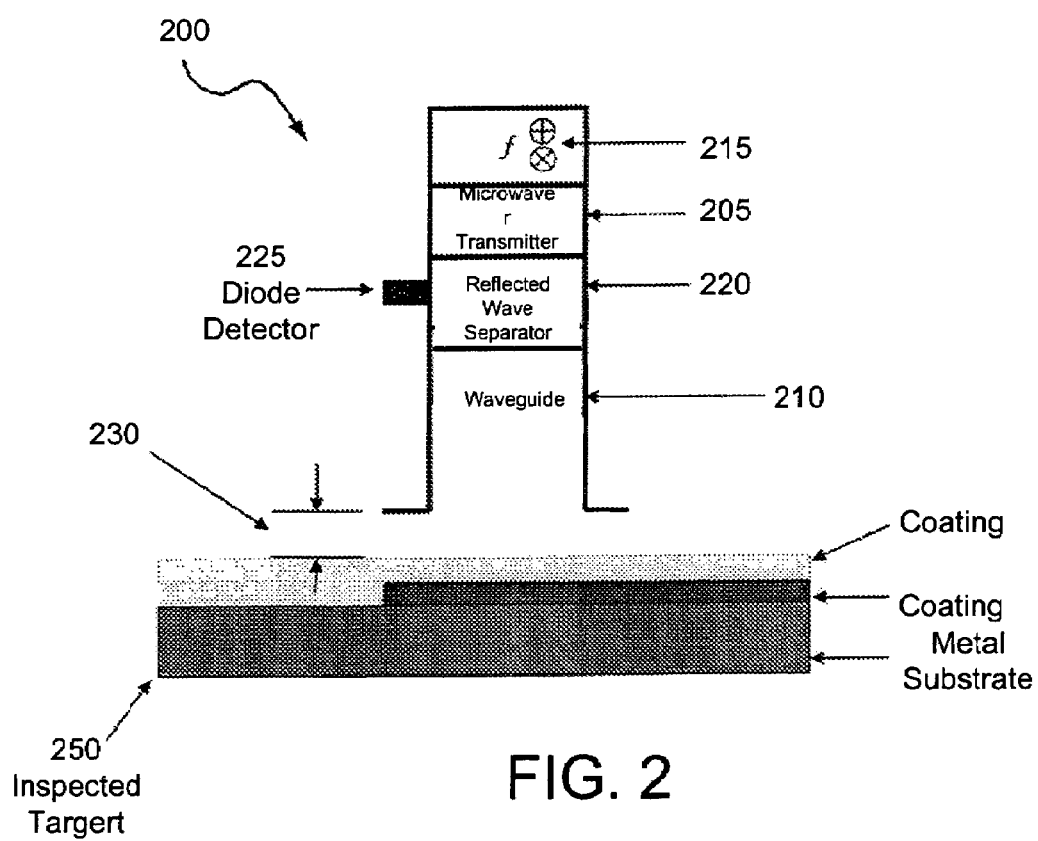
FIG. 2 illustrates a block diagram of a nondestructive evaluation sensor and associated components in accordance with an embodiment of the present invention.

The basic design of a microwave assembly in an NDE sensor can be relatively simple. FIG. 2 illustrates the basic components of microwave NDE sensor 200. A microwave transmitter 205 is the source of microwave energy for the device 200 and should generally be matched to a waveguide 210 in frequency. The frequency can be tuned by adjusting the device's transmitter frequency controls 215, which can be in mechanical and/or electronic form. A reflected energy separator 220, such as a three-port circulator, can be used to separate reflected energy from the incident microwave signal. A circulator typically uses a ferrite material biased by a DC magnetic field, which routes microwaves differently depending on the direction of propagation, thereby allowing the reflected waves, traveling backwards, to be separated from the primary waves, traveling forward. This allows the reflected wave quadrature components to be measured directly and eliminates the requirement of using multiple sensors at precise positions to characterize the standing wave, and then derive information about the reflected wave from the composite standing wave information as described in U.S. Pat. No. 6,005,397 to Zhoughi. A Gunn-type diode detector 225 (diode) can sense radiated microwave energy and convert it into an electrical signal. The antenna 210, can be constructed or designed as a horn or other common microwave radiating device with flanged ends and matching the size to the band of the transceiver 205. The standoff distance from an inspected target 250 can be maintained by using a scanning truck assembly (FIG. 1, element 130) or a coating machine robotic control.

The frequency band, for example, K band or 24 GHz in a preferred aircraft MTD tool, generally determines the transceiver type and the antenna sizes. These components are readily available and good quality (defined by the ability to separate and detect incident and reflected signals, and tool reliability) devices can be obtained for reasonable cost. In an NDE device that can be deployed in a portable configuration, it is preferred that the transceiver be battery powered and relatively small. Depending upon the requirements of the particular application, the microwave transceiver used can range from a full frequency adjustable devices that must be driven by expensive microwave synthesizing equipment, to inexpensive department store door opener sensors or police radar guns.

Radio frequency signals can interfere with the output signal from the diode, reducing accuracy. This interference can be eliminated by placing blocking capacitors at the circulator output. Frequency tuning for the device can be provided by a low power signal. Furthermore, standoff distance in an open-ended waveguide is essentially a tuning parameter, and the output of the device varies as standoff is changed.

A series of experiments was conducted to determine the optimal standoff distance for maximizing reflected signal amplitude. A 7 mm standoff produced the highest signal to noise ratio for a K band device. The standoff optimization was repeated after frequency tuning voltage was added, but the value for maximizing signal to noise remained at 7 mm. Once optimal standoff distance is determined, it may be preferred in some embodiments that the standoff distance is maintained by a scanning truck. The scanning truck can provide for distal adjustments mechanically using means known in the art. For example, standoff distance can be accomplished by using small wheels 135 in a truck assembly 130 as shown in FIG. 1 that adjustably suspend the device roughly 7 mm above the inspected target. It may also be desirable to provide a trolley so that alternate truck shapes can be adapted to the tool for use in diverse areas such as corners and joints.

Both tuning and power voltage can be obtained from the same power source. This can be accomplished using a relatively simple voltage splitting circuit that can yield 14.1 and 5-volt signals from a battery or AC rectifier of approximately 24 volts. Tuning can also be fixed during manufacturing or during factory acceptance testing.

A visual and/or audible alarm/indicator circuit (not shown, but generally known in the art) can be designed and built to interpret the output of the MTD sensor, and would be useful for thickness evaluation. Through filtering, automatic gain control (AGC), and classic signal processing/display circuitry, the accuracy of measurement is enhanced. Generally the signal to noise ratio associated with thickness detection is directly proportional to the difference between the uncoated background and the signal from the coated substrate.

Figure 3:
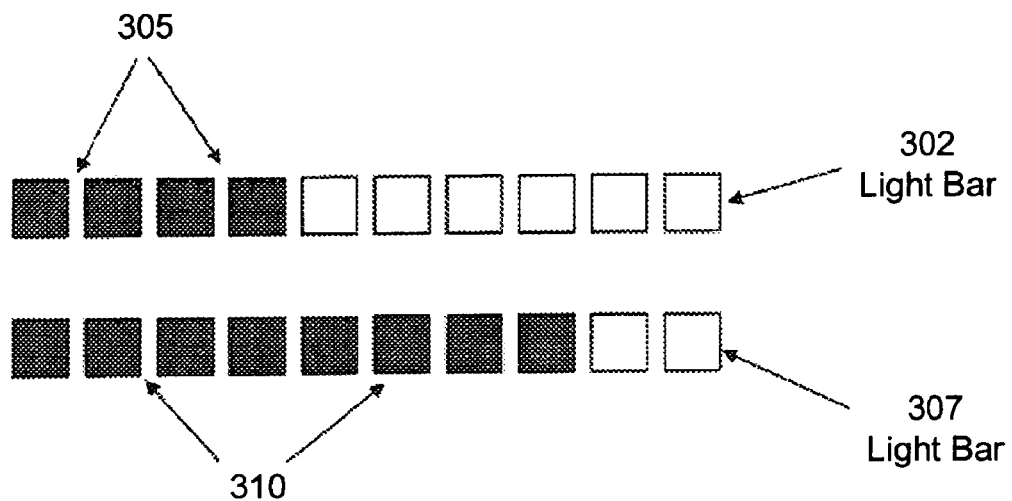
FIG. 3 illustrates thickness indicators that can be utilized in accordance with an embodiment of the present invention.

The display can be, for example, a digital numeric or a light bar indicating thickness. A light bar series might look something like that illustrated in FIG. 3. The number of lights turned on can be based on a threshold circuit output that in turn begins at the output of the Gunn diode. For example, if lights 305 are lit along the light bar 302, then a thinner layer is indicated. But if more lights 310 are lit along the light bar 307, then a thicker film may be indicated. The display size and power requirements can be determined based on variable housing designs. The length of light bars like those shown in FIG. 3 can be on the order of 1.5-2.5 inches, and can sit atop and be integrated with a handle of MTD inspection tool. The device could also include an output port for recording the data as it's collected.

Power requirements can be expected to be on the order of 24 V and under 0.5 watts, and could be provided by batteries that would allow periods of operation to 8 hours. This power requirement is well within the range of modern rechargeable tool technology. A simple 110 V line cord can be used as a reliable, low cost option, and avoids recharge down times, but a cord limits mobility.

Figure 4:
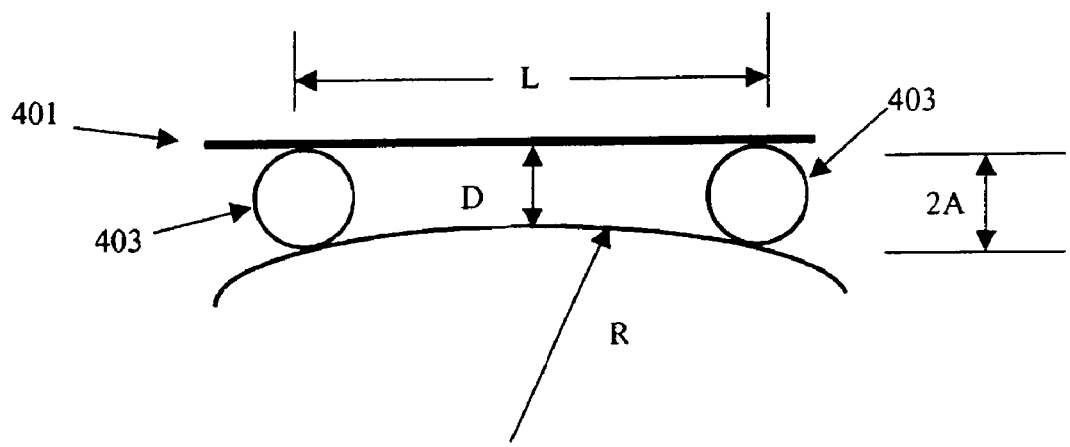
FIG. 4 illustrates a block diagram of geometric considerations for a truck assembly that can be utilized in an embodiment of the present invention.

Typical dimensions for a MTD inspection tool are shown in FIG. 4. The truck assembly 401 maintains the antenna above the surface being inspected at a distance of D±1.5-mm. Although a preferred standoff, D, for one embodiment is 7 mm, the optimum distance can change for different embodiments. The truck can be constructed such that the suspension height is maintained with about 1.5 mm when all wheels 403 are in contact with the target 410. The radius of curvature, R, of the surface inspected, the wheelbase, L, wheel radius, A, and the suspension distance, D, are shown in the sketch of FIG. 4. As the wheel base L increases the suspension height D becomes smaller for a fixed curved surface radius R. This relationship can be mathematically expressed as:

$$D = 2 \cdot A - R + \frac{1}{2}(R2 + L2/4)$$

Figure 5:
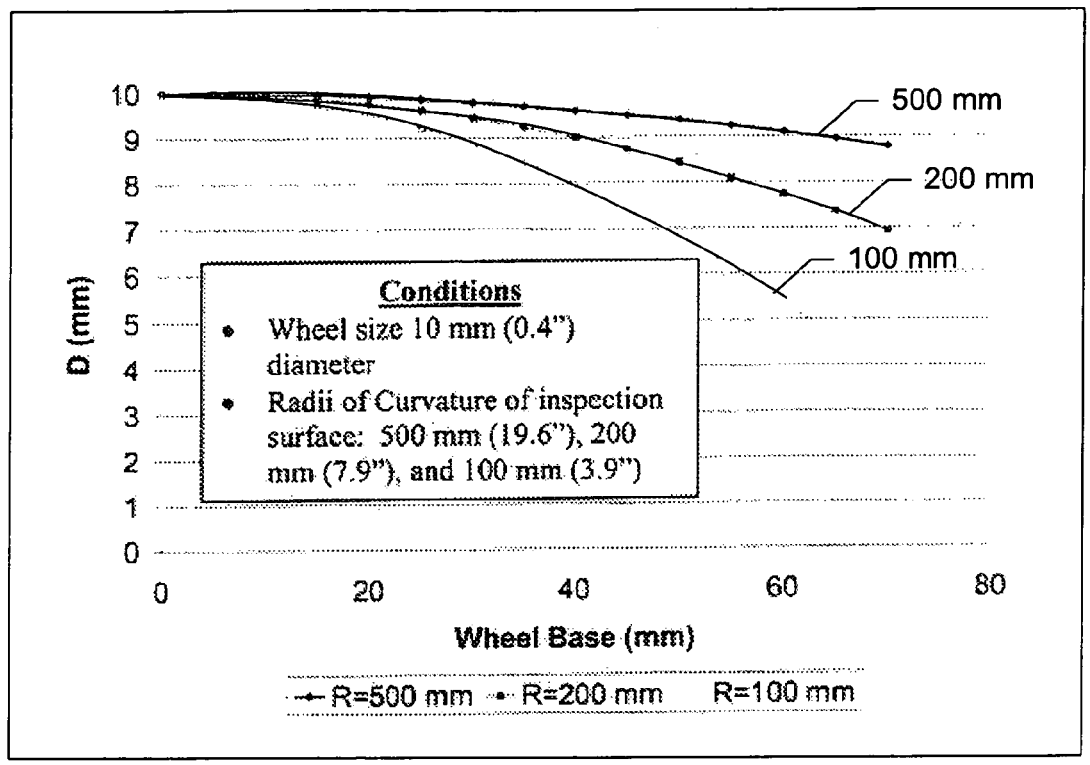
FIG. 5 is a graph illustrating distance measurements to an inspected surface as a function of a truck assembly's wheelbase for a wheel of 10 mm diameters at three curvature levels.

FIG. 5 shows D as a function of the wheelbase length L. The truck wheel size in the example was chosen as a 5-mm radius wheel (10 mm diameter, or 0.4 inches). The error in assuming D is 10 mm (2 A) doesn't reach 1.5 mm (D=8.5)

until the radius of curvature of the inspection surface is approximately 100 mm (≈4 inches) for a truck wheelbase of 35 mm (about 1.4 inches).

Design relationships such as the one illustrated in the FIG. 5 can be utilized to size the truck. Competing factors such as stability, which call for a large wheelbase, and the potential error in standoff distance D, which call for a small wheelbase, may be traded off in the truck design.

Figure 6:
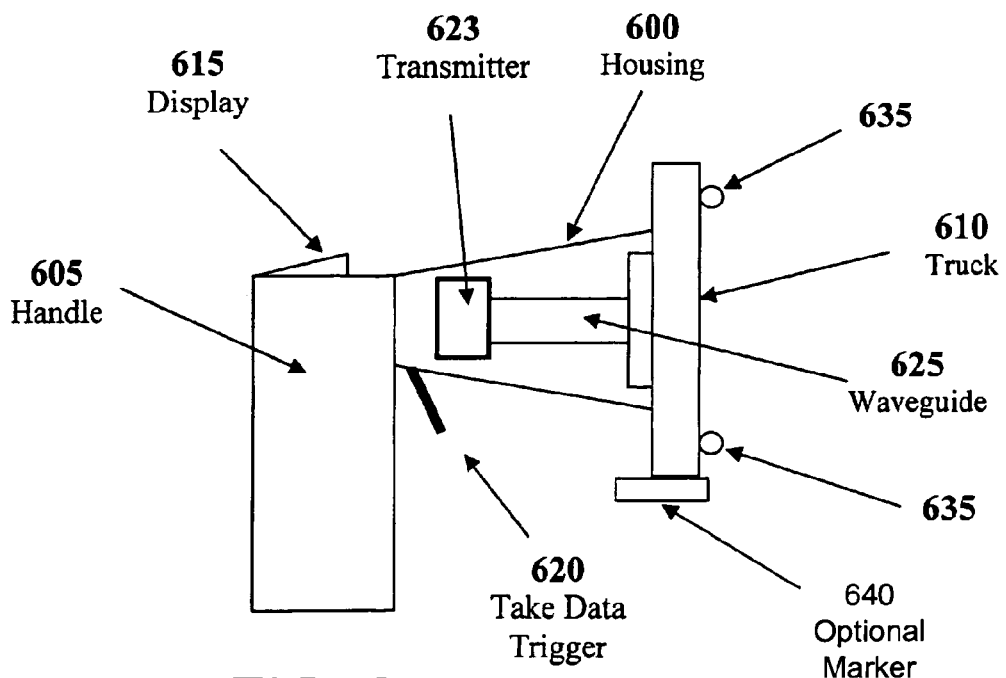
FIG. 6 illustrates a block diagram of a system including a truck assembly, handle, housing and sensor components in accordance with a preferred embodiment of the present invention.

A preferred truck is easy to move in a scanning motion. A handle 605 can be integrated into the truck in manner somewhat like that shown in FIG. 6. A handle 605 allows an operator to easily guide the truck 610 along the surface of a target. Detection electronics and associated display/alarms can be built into handle 605, with a display 615 preferably sitting in an area above the handle's 605 handgrip area. Audible alarms (not shown) can take two forms—either "thickness out of specification," or "don't take data." The latter would be the case when a trigger 620 is pulled while the truck 610 is not in proper contact with the target/surface being inspected. The correct balance of weight, size, and moment between the handle 605, truck 610, and waveguide systems 625 can impact the ability for a unit to scan quickly and comfortably.

The housing structure 600 between the truck 610 and the handle 605 has a number of functions. It provides the structural support for the entire assembly, smoothly connecting the truck 610 and the handle 605 with a rigid interface. The housing 600 protects the microwave transceiver 623 and can contain the wiring and connections to the handle 605 detection/display circuitry 615 and any power supply associated with the unit. The housing 600 provides a smooth interface with the truck 610 that places the antenna associated with the transceiver 623 at an optimal orientation with the inspection area and can enable the ability to change truck features when inside corners or other shapes require it. A system can also, for example, resemble a cordless rechargeable drill with a flat head roughly 1-3 inches on a side with rollers or wheels for contacting the target's surface.

An optional marking device 640 can allow the operator to mark areas where thickness is out of a specified range. Such functionality could be provided using, for example, inking or tagging mechanisms integrated near the assessment area. This provides an accurate location for the device at the time of the marking device actuation, possibly through the use of a template to locate the transceiver/antenna center, and is useful for locating points in the substrate under a smooth coating such as bolt heads, rivets, and fasteners. In a preferred embodiment the marking system consists of two plotter pens actuated by solenoids on either side of the antenna, and a template is used to locate the center of the antenna after marker actuation.

The device housing 600 can also include shielding of stray microwave radiation. Commercially available transceivers, such as police radar transmitters, will typically have passed UL shielding tests in other applications. The transmitters are low power devices, typically on the order of $1/100$ to $1/1000$ as powerful as a microwave oven. Housing materials can include integral shielding materials such as a copper weave or similar approach. The invention is not limited to any particular scanning format. Thickness detectors can be mounted on robot arms, or on a fixed surface that coated parts move past.

It should be appreciated by those skilled in the art that more elaborate information displays and data enabling technology can also be incorporated into embodiments of the invention to render assessment results without departing from the scope and teaching of the invention. For example a microprocessor and liquid crystal display may enable additional data processing and visual assessment capabilities to a user of the invention; however, additional user interface technology such a microprocessors and screen displays add cost and weight to the overall device. The device can also record results utilizing memory technology (device-based or removable) also well known in the art. Standard K and X band transceivers can be considered as a commodity part of the device and some are well known, for example, in employment in police radar guns and automatic door openers.

NDE methods take advantage of the way in which incident radiation interacts with layered dielectric media. As the dielectric characteristics under the aperture of the antenna change, the reflected signal changes. On an aircraft, the layers of materials over bright aluminum typically include an anti-corrosion coating, a primer coating, and a topcoat, or an appliqué. These dielectric layers affect the transmission characteristics of the microwave signal in a relatively constant fashion on the skin of the aircraft. Below are provided examples of how the microwave signal is correlated to film thickness to provide a thickness measurement based on the measurement of the reflected microwave.

Example of a Measurement Method

Because the inspection tool 100 described above when held against a structure maintains the microwave sensors a fixed distance away from the top surface of the coating, the distance between the microwave sensors and the underlying reflective or partially reflective surface signal will vary with the thickness of the coating. The dielectric coating layer causes a change in its quadrature components of the reflected wave, as indicated by the sensor I and Q outputs, and shifts the standing wave pattern. The change can be used to determine thickness or dielectric properties of the material composing the coating.

Figure 7:
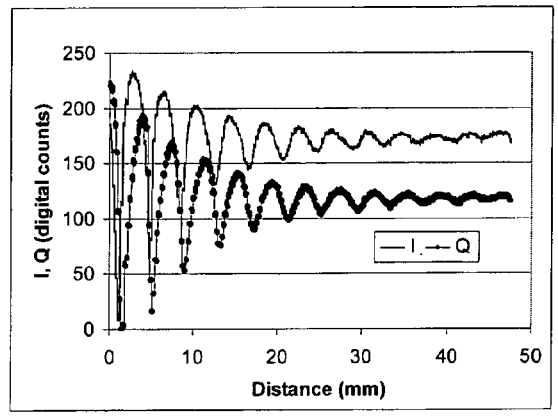
FIG. 7 shows distance as a function of I and as a function of Q of the reflected wave.

FIG. 7 shows a calibration curve for a typical microwave thickness measuring device. The calibration curve is derived by setting the microwave receiver at known distances from a bare metal surface, measuring "I," the in-phase output, and "Q," the quadrature output, of a microwave transceiver as a function of distance from the surface, and then plotting I and Q as a function of the distance from the metal surface. A best-fit curve is then determined from the measurement points to characterize the relationship of I and Q with distance. The curves can be derived in part from the calibration measurements and in part by mathematical modeling. Different parts of the curve can be modeled using different equations, or a single equation can characterize the curve over its entire useful range. In making the measurements to produce the calibration curves, the desired distance from the metal can be established by using shims of a low dielectric constant material or by using actual coatings of the same material as that which will be measured. Because the dielectric properties of the coating can affect the results, it is preferable to use actual coatings.

As shown in FIG. 7, as the transceiver moves away from the metal surface, the I and Q components each vary similar to damped sinusoidal functions. The use of calibration standards improves the accuracy of the mathematical modeling by substituting empirical measurements for assumptions about the system. The curve of FIG. 7 shows that a specific distance produces one and only one I, Q pair, for at least the first several cycles of the sinusoid, that is, distance is not a function of I or Q alone, but of both.

Figure 8:
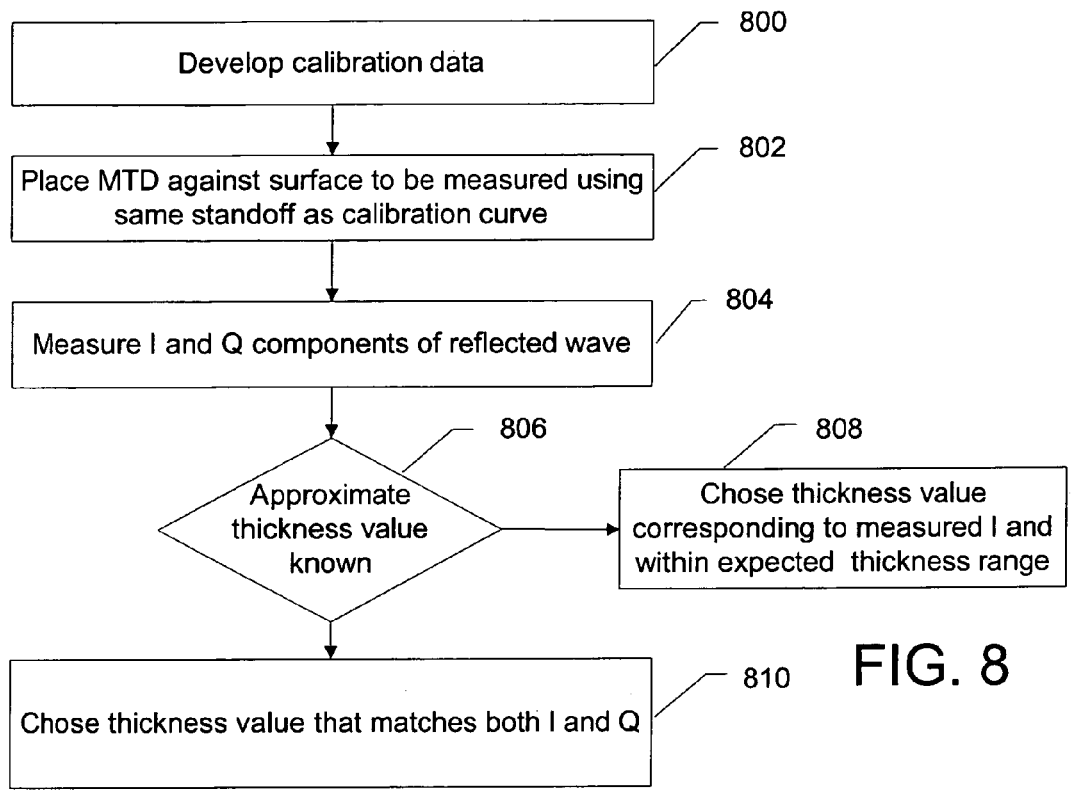
FIG. 8 shows a preferred method of determining film thickness using the calibration data of FIG. 7.

FIG. 8 shows a preferred method of using the calibration curve of FIG. 7 with the MTD to determine film thickness. In step 800, calibration curves, such as those in FIG. 7, are created as described above. In step 802, the MTD device is placed against the surface to be measured, at a known standoff set on the truck. In step 804, I and Q are measured. For a given I, one can find several corresponding thicknesses. In step 806, if an approximate value of the thickness is known, then in step 808, the thickness nearest that value and corresponding to the measured I is determined to be the measured thickness. If the approximate value is not known, then the Q component is checked at each possible thickness value corresponding to the I measurement, to find a thickness at which both the I and the Q components match the measured values. Some functions of I and Q, as an example phase angle, are not unique over a wide range, and in their use can result in thickness results that are ambiguous. While comparing values with a graph has been described, known algorithms can be used to automate this function, and the resulting thickness can be displayed to the operators and/or stored for later analysis.

Second Example of a Measurement Method

Figure 9:
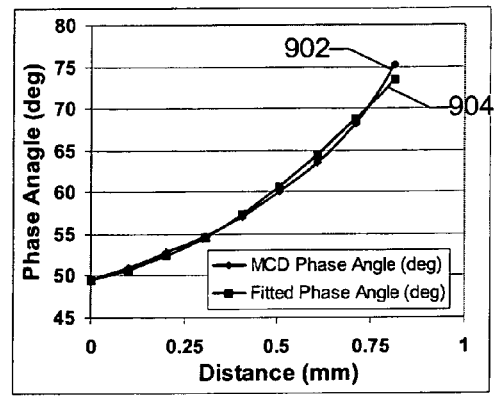
FIG. 9 shows distance as a function of phase angle of the reflected wave.

In general, the phase angle of the reflected wave does not uniquely determine the layer thickness, because phase angle is a cyclic function of thickness. By selecting a suitable stand-off distance, however, one can operate in a specific region of the phase angle versus thickness curve, as shown in FIG. 9, in which the curve is roughly parabolic and avoid cyclic ambiguities. FIG. 9 shows a first curve, 902, on which measured values are plotted, and a second curve, 904, which is a best fit parabolic curve determined from the measured values over the paint thickness range shown. As the paint thickness increases, the distance from the substrate increases and the phase angle increase as in shown in FIG. 9.

It can be seen in FIG. 9 that a calibration-based algorithm can be developed based on phase angle for coating thicknesses from roughly 4-40 mils (0.1-1 mm). For thicknesses greater than about 40 mils, the phase angle versus coating thickness curve is periodic, and it becomes more difficult to uniquely determine a film thickness from the phase angle measurement. The thickness range of 4-40 mil (0.1-1 mm) is a range of interest for many coatings, and a simple curve fit to a parabolic shape for the phase angle versus distance curve of FIG. 9 provides an easily implemented algorithm for determining film thickness.

Figure 10:
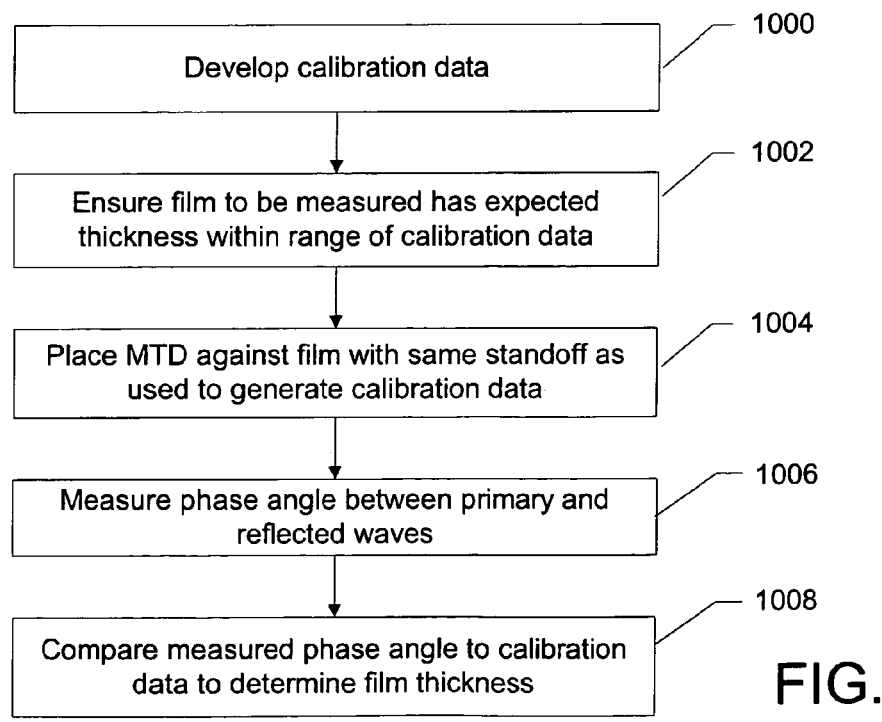
FIG. 10 shows a preferred method of determining film thickness using the calibration data of FIG. 9.

FIG. 10 shows a procedure for using the curve of FIG. 9. In step 1000, calibration data similar to that shown in FIG. 9 is developed by measuring calibration standards of known thickness as described above. In step 1002 range, the operator ensures that the thickness of the film to be measured is within the thickness ranges covered by the calibration data. In step 1004, the MTD 100 is placed against the surface of the film to be measured with the stand off distance set to the same stand off distance that was used to derive the calibration curve. In step 1006, the phase angle between the primary and the reflected wave is measured using the MTD. The phase angle can be determined by measuring I and Q and computing arctan(I/Q). In step 1008, the measured phase angle is compared with the calibration curve to determine the coating thickness.

This routine is very efficient and has been implemented in the MTD onboard microprocessor. A calibration block provides a check to verify the coating depth. The coating thickness resolution for the MTD design is roughly ±0.5 mils (0.013 mm). This resolution is ultimately defined by the frequency of the transceiver (the example, the MTD operates in the K band and is centered at 24.125 gigahertz) and the antenna design. The MTD antenna is horn-shaped to maximize the spot size of the inspection. X band microwaves or other frequencies can also be used. Other antenna designs and frequency ranges may improve resolution in this coating thickness range. Open-ended waveguide antennas have been extensively investigated, and evanescent wave techniques may be used in some embodiments. Applications which require no more than ±0.5 mil (0.013 mm) resolution in coating thickness over the range 4-40 mils (0.1-1 mm), however, can be handled with the embodiment described in this example.

Example of a Measurement Method Providing a Wide Thickness Range

Figure 11:
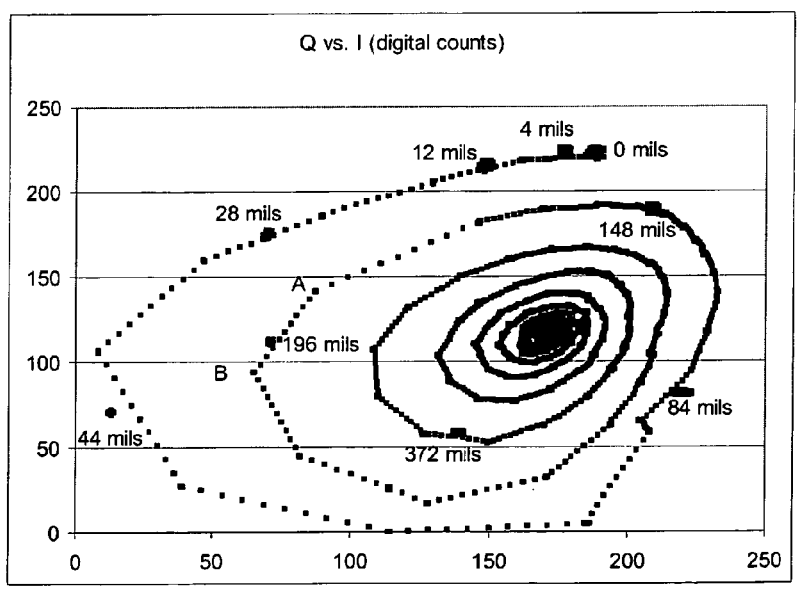
FIG. 11 shows thickness plotted against I and Q.

There are a number of applications in which measurement of thicker coatings are needed. Examples include space shuttle thermal protection materials, insulation on pipes, and thick polymer coatings. Because the reflected wave phase angle, as an example, is a periodic function, a phase angle measurement can correspond to more than one coating depth on the calibration curve. One solution is based on a plot of coating thickness versus Q and I. This produces a spiral in Q, I space as seen in FIG. 11. Each point in the spiral includes a step of 8 mils in thickness in the example measurement. As the coating thickness of a low dielectric strength coating is increased to roughly 2 inches (5.1 cm) the spiral continues to curl in upon itself. The center of the spiral represents a distance so far form the reflector that the I, Q values at that point are the same as when the transceiver is pointed to open air. For a given I, Q combination, a unique thickness value on the curve can be determined. FIG. 11 shows calibration data measured at 0, 4, 12, 28, 44, 84, 196, and 372 mils (0, 0.1, 0.3, 0.7, 1.1, 2.1, 5, and 9.5 mm) with thickness plotted against I and Q, and a spiral calibration curve superimposed onto the measurements. Each marked data point is actually a collection of roughly 200 individual samples of I and Q, with each measurement individually plotted to provide an indication of the uncertainty associated with system noise. The spread of these data (which show up as dark spots with a thickness value on the plot,) appear to be small compared to the spiral arm separations until very large coating depths are measured (toward the center of the spiral).

As an example, the points marked A and B on the curve are 192 and 200 mils (4.9 and 5.1 mm), respectively, and the 196 mil (5 mm) data point falls roughly midway between them. The approach of plotting thickness against I and Q has a number of advantages:

Coating thickness measurements in excess of ½ inch (1.27 cm) are uniquely determined on the I vs. Q calibration curve.

A simple field calibration to determine thickness is possible. The center of the spiral is effectively at an infinite distance from the substrate—and the I, Q value to locate this center is easily determined by measuring I and Q in free space. These data can then be translated to put the center of the spiral at the origin.

The spiral shape of the calibration curve can often be expressed analytically with a three parameter fit (two for the basic spiral shape, one for the cant angle of the spiral—similar to a canted parabolic fit). As a result, the calibration spiral can be stored with 3 numbers and an equation, making correlation between the measurement and thickness readily calculated by an on-board processor. Alternatively, a look-up table can be stored and an interpolation algorithm can be used for measured values in between table values.

Figure 12:
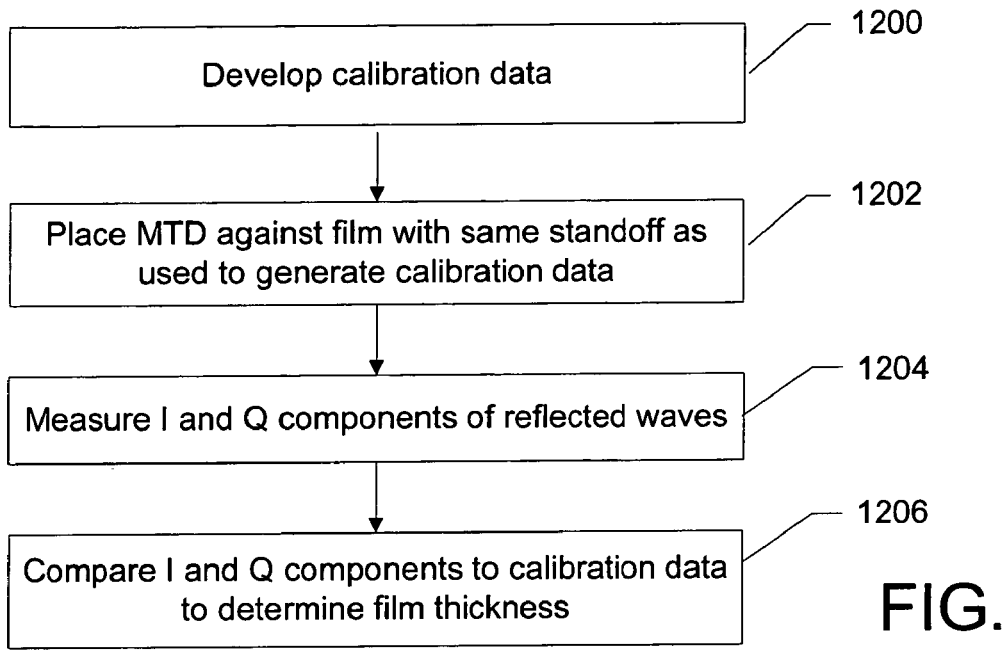
FIG. 12 shows a preferred method of determining film thickness using the calibration data of FIG. 11.

FIG. 12 shows preferred steps for measuring thickness in accordance with one embodiment. In step 1200, calibration data is developed as described above by measuring I and Q as a function of known thicknesses of calibration standards. In step 1202, the MTD 100 is place against the surface of the film to be measured. It is preferred that the stand off distance is set to the same stand off distance that was used to derive the calibration curve, although a different stand off value can be used and compensated for mathematically. In step 1204, the I and Q components of the reflected wave are measured. In step 1206, the I and Q components are compared with the calibration data to determine the coating thickness. A proximity algorithm can be used to locate the nearest point on the calibration spiral to producing an estimate of the coating thickness. The resolution of this technique is expected to be about ±0.5 mil (0.013 mm) since the frequency and antenna design remain the same as in the technique described in the example above.

The thickness range covered by this technique can be varied by selecting a band and/or antenna suitable for the desired range. For example, higher frequencies can be used to determine spirals to cover the 0-5 mil (0-0.13 mm) range, and lower frequencies can be used to cover thickness ranges in excess of one inch.

While this embodiment, as well as other embodiments, has been described for determining thickness, most embodiments can also be used to determine the dielectric properties of the coatings when thickness is known.

Example Suitable for Wet Film Thickness Measurement

As described above, in some embodiments, rather than the stand-off distance from the paint surface to the sensor remaining constant, the standoff distance from the underlying substrate remains constant. This can be achieved because the contour of the underlying substrate is accurately known from computer-aided design data. A robotic arm on which the microwave transceiver is mounted can be programmed to accurately follow the contour of the underlying substrate using the CAD data from the substrate manufacturer. The sum of the paint thickness and the air gap will then be constant, and the signal will depend upon how much of the total distance is air and how much is coating material.

Very accurate positioning of robot arms is currently available using conventional robotic technology. For example, U.S. Pat. No. 6,489,741 to Genov, et al. for "Robot Motion Compensation System;" and U.S. Pat. No. 6,317,651 to Gerstenberger, et al. for "Trajectory Generation System" teach methods for accurately positioning robot arms. The robot can contact the structure at calibration points to learn the position and orientation of the work piece. The robot can then follow the contour at a specified offset using the CAD data. This example shows a method for measuring wet film thickness on an automatic or semi-automatic robotic paint applicator. By measuring wet film thickness as the coating is applied, the painting apparatus can adjust the amount of paint being applied in real time to ensure that the thickness applied meets specification, thereby eliminating the expense of excess paint or rework.

Figure 13:
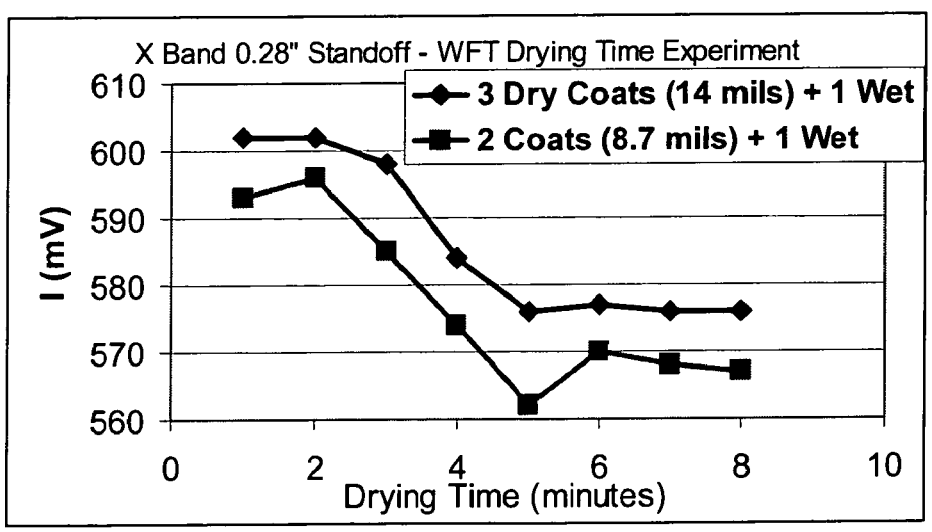
FIG. 13 shows the I component versus time of a microwave reflected from coated surfaces that were in the process of drying.

When measuring a wet film that is being applied over pre-existing dry coating layers, it is necessary to separate out the effects on the reflected microwave signal due to the pre-existing dry layers so that the effects of the newly applied wet layer can be correlated to wet layer thickness calibration data. The microwave response to coating changes as the solvent evaporates and the coating dries. FIG. 13 shows X band responses as wet coatings containing eighty percent solids dry over pre-existing coatings. The response is stable for about the first two minutes, and then the response changes rapidly until the coating is dry. The wet film thickness measurement is preferably performed as soon as possible after the coating is applied and preferably within the stable response area of the drying curve, for example within thirty seconds, within one minute, or within two minutes. In one embodiment, the determination of the thickness of the wet layer is determined by first measuring any pre-existing layers, then measuring the wet layer on top of the preexisting layers, and finally compensating for the effects of the preexisting layer to determine a thickness of the wet layer. Although it may be is possible to measure the thickness of the pre-existing layers at a few points and assume that the thickness is uniform, such assumptions may not provide sufficient accuracy for many applications. Moreover, the surface roughness of the underlying structure may vary from place to place on the surface, and the surface roughness affects the microwave response. Thus, for improved accuracy, it is preferable to measure the thickness of the dry film as close as possible to the same spot at which the wet film is to be measured.

One embodiment for measuring WFT over a dry film includes at least two sensors mounted on a coating applicator apparatus. One sensor precedes a spray nozzle of the coating applicator apparatus and measures a point before the target is newly coated. Another sensor follows the nozzle and measures approximately the same point as the first sensor, but after the new coatings is applied and while it is still wet.

In determining WFT from the two sensors, it is necessary to consider their trajectories to ensure that they are measuring approximately the same point. Sophisticated coating applicators include distance sensors to determine the distance from the applicator to the surface, and the distance sensors can assist in determining the position of the sensors.

Figure 14:
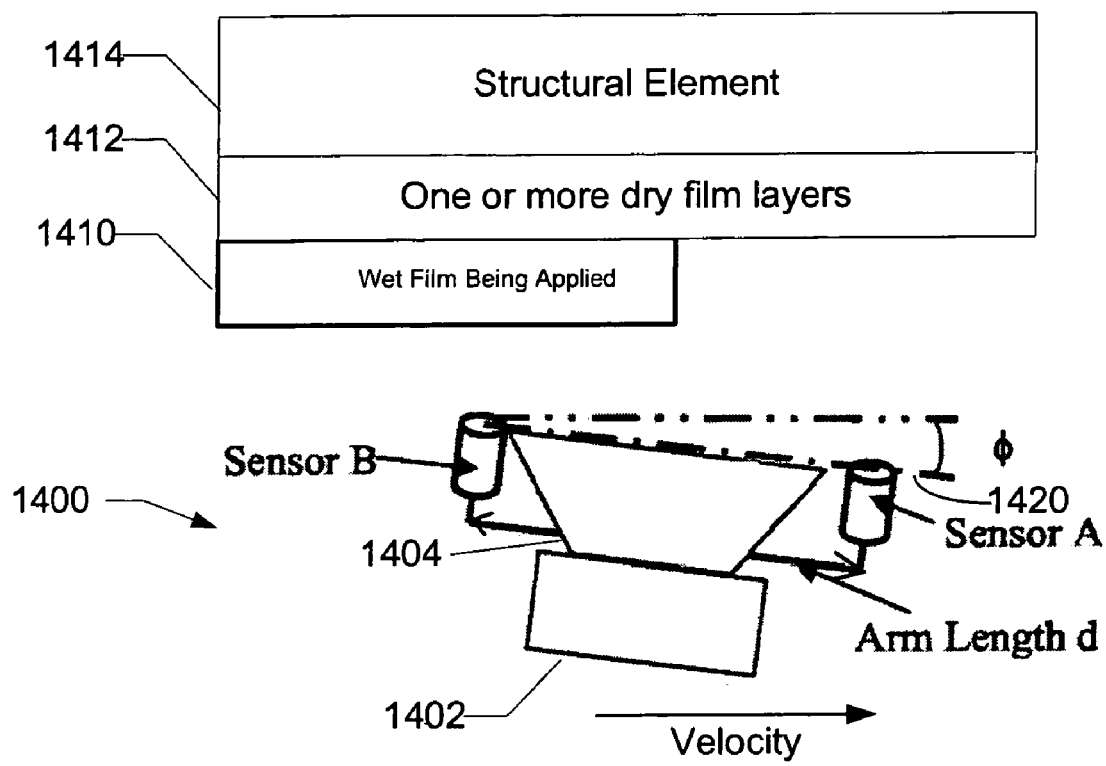
FIG. 14 shows an automated or semi-automated coating applicator for applying a film, the applicator incorporating a measurement system for measuring a dry or wet film thickness in accordance with an embodiment of the invention.

FIG. 14 shows a dual sensor system 1400 for determining the thickness of a wet film 1402. System 1400 includes a robotic arm 1402 that supports a spray mechanism 1404 onto which are mounted a Sensor A and a Sensor B separated by a distance "d." System 1400 can be used to measure the thickness of a wet film 1410 being applied over an existing layer or layers of dry coating 1412 on a conductive or semi-conductive structural element 1414. Of course, system 1400 can also be used for the simpler case in which the wet coating 1410 is applied directly onto an unpainted structural element 1414. FIG. 14 shows that the two sensors are mounted on the spraying apparatus, with sensor A being mounted to precede the spray nozzle in the direction of motion, and sensor B being mounted to follow the spray nozzle. Sensors A and B can be similar to the microwave transceiver sensors described in previous examples, although the housing is adapted to be mounted on the coating applicator apparatus instead of being hand-held, and the microwave transceiver preferably operates in the X band.

While it would be ideal for the sensors to be positioned in a plane parallel to the surface of structural element 1414 being coated, there is typically some small angle, $\phi$, between the surface and a plane 1420 containing the sensors. The angle $\phi$ causes the stand-off distance of the two sensors to be different, and this difference must be considered in comparing the signals from the two sensors. The angle $\phi$ also causes the distance between measurement points to be $d \cdot \cos \phi$ instead of simply d.

Both sensors are moving relative to the structure being coated and are making measurements as they move, so it is necessary to determine which part of the continuous output of each sensor corresponds to same point on the surface. One way to correlate the signals in time is to determine the delay between the time that Sensor A measures a spot and the time that the Sensor B measures the same spot.

If a clock starts as sensor A passes a given point, then $d \cdot \cos\phi/v$ seconds will have elapsed by the time sensor B passes the same point. For example, if the sensors are two meters apart, and the coating apparatus 1400 moves at a constant velocity of 22 cm/sec, the time delay is about 9 seconds. The phase angle at the B sensor, $Phase_B$, at time d·cos φ/v is a function of the distance from the metal surface and of the thickness and the dielectric properties of the wet and dry films, that is:

$$f[I, Q]_B(t-d\cdot\cos\phi/v) = f(\text{total standoff}) = f(WFT'+DFT+SO_B). \quad (1)$$

where $SO_B$ is the standoff distance from Sensor B to the wet film, and WFT' is a wet film thickness derived from a dry film calibration curve, (which is later corrected to get true WFT using a wet film calibration curve,) and $f[I,Q]_B(t)$ indicates a function of the I,Q pair at point B at a specific time t. An example of such a function is the phase angle of the reflective wave over a region in which cyclic ambiguity is not a concern.

Assuming f is an invertible function over the relevant range, $$WFT'+DFT+SO_B = f^{-1}[I,Q]_B(t-d\cdot\cos\phi/v) \quad (2)$$

For example a parabolic function can be used can be used in some applications in some thickness ranges to characterize the relationship between the reflected wave phase angle and the coating thickness, and the inverse relation comes from solving the quadratic equation using the phase measurement at each point to derive a thickness. The measurement and calculation is typically performed multiple times, for example, 128 times a second, while the paint is being applied. The parameters of the quadratic equation are derived by a calibration performed on different thicknesses of the material to be inspected, as described above, which method has been shown to provide an accuracy of ¼-½ mil in DFT measurement using the MTD with a fixed mechanical standoff distance. A spiral function as described above in FIG. 11 could also be used, as could any other similar relationship. In some embodiments of the WFT system, determining the standoff distance may be the greatest source of error.

In a manner similar to equation (2) we can solve for the total standoff at sensor A, $$DFT+SO_A = f^{-1}[I,Q]_A(t) \quad (3)$$

Because the sensors are connected by a rigid arm $$SO_A = SO_B + d\cdot\sin\phi \quad (4)$$

From this it can be seen that $$WFT'-d\cdot\sin\phi = f-1[I,Q]A(t)-f-1[I,Q]B(t-d\cdot\cos\phi/v) \quad (5)$$

Figure 15:
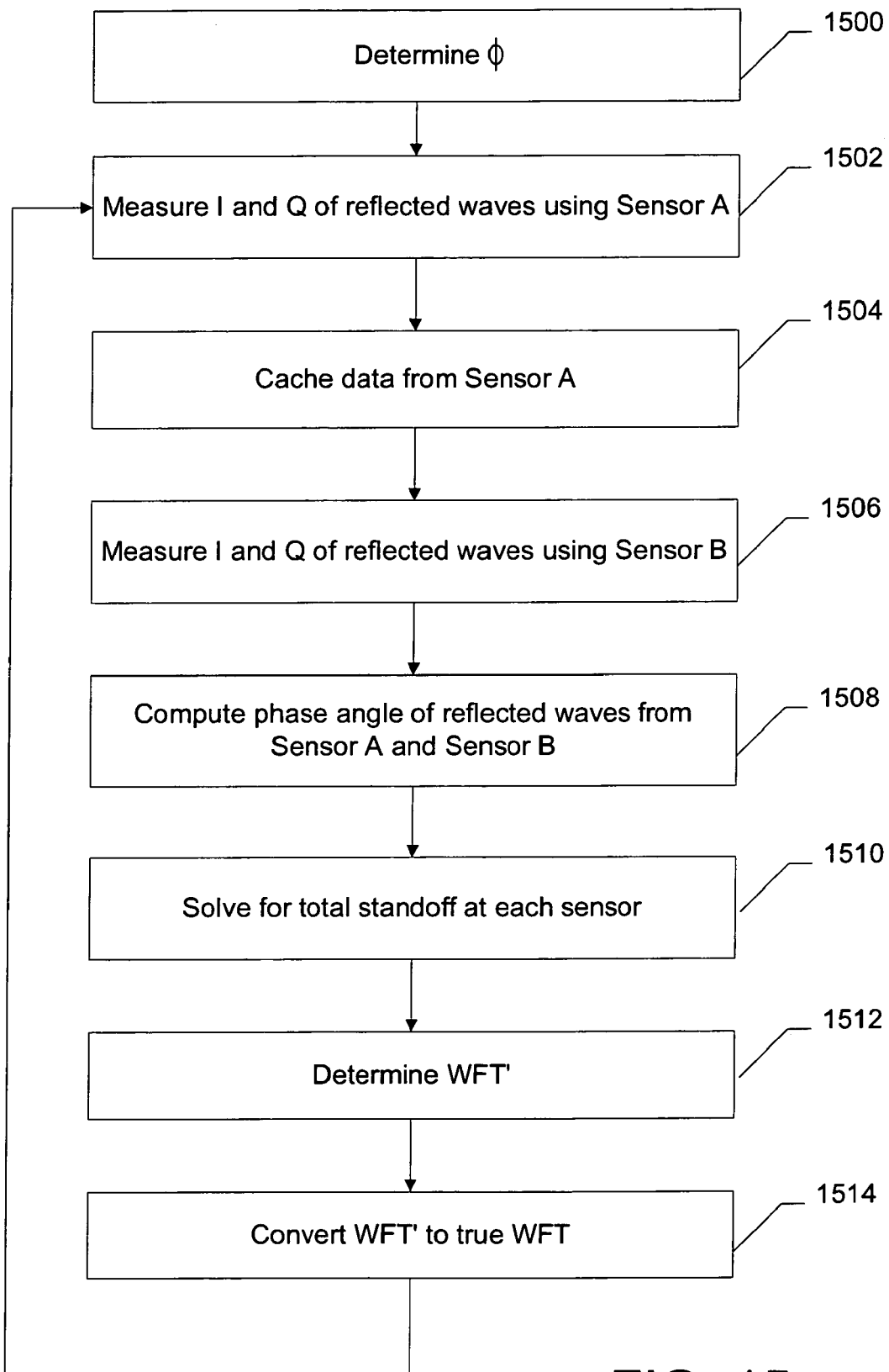
FIG. 15 is a flowchart showing a preferred method for using the system of FIG. 14.

The primed term, WFT', is due to the implicit assumption that wet and dry layers have the same dielectric characteristics. This is clearly not the case, but WFT' can be easily converted to true WFT by using a calibration curve made with a wet film. This calibration curve can be determined because the relationship between the quadrature components and the dry film thickness or wet film thickness can be determined as described in previous examples. The quadrature components, therefore, can be used to correlate the dry film thickness to the wet film thickness. WFT can be measured non-destructively using the following method as shown in FIG. 15.

In step 1500, φ is estimated, for example, from two or more distance sensors spaced apart on the coating applicator 1400. In step 1502, Q and I of the reflected waves are measured by sensor A before the coating is applied. In step 1504, the data from sensor A is cached for a period of d·cosφ/v seconds. At normal paint applicator speeds, this is roughly 7-15 seconds for d=2 meters. In step 1506, Q and I of reflected waves are measured by sensor B after the coating is applied, at same position that was previously measured by sensor A. In step 1508, the phase angles for each of sensor A and sensor B are computed from the standard microwave relationship:

$$\text{Phase angle} = \arctan(Q/I) \quad (6)$$

Figure 16:
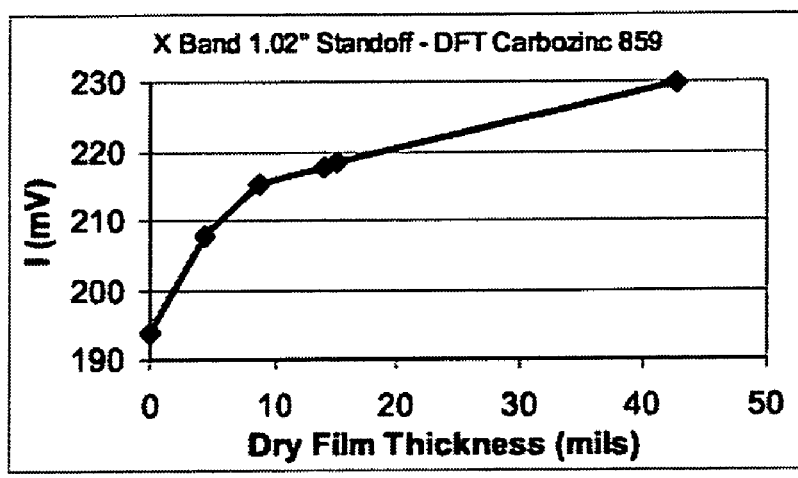
FIG. 16 shows a graph of I versus dry film thickness.

In step 1510, the total standoffs at Sensor A and Sensor B are determined by solving $f^{-1}$(Phase A)=Total Standoff A and $f^{-1}$(Phase B)=Total Standoff B (equation (1)) and (5)) using coefficients derived from a calibration of phase or a similar microwave parameter vs. DFT. For example, FIG. 16 shows an example an X band sensor DFT response in I at 1.02 in standoff for an 80% solids Zn-based paint. In step 1512, WFT' is determined from equation 5, and in step 1514, WFT' is corrected for calibration differences between DF and WF to determine true WFT. The calculation is repeated multiple times, for example, 128 times per second, and the calculation results smoothed into 16 samples per second for WFT control.

Besides considering the effect of the tilt angle φ, one must also consider other sources of systemic error, such as the vertical angle, that is, the pitch between the coating apparatus and the target surface. Other error factors include constant velocity and standoff assumptions.

Pitch angle and spray head velocity can be estimated to control the motion of applicator 1400. Because of the large baseline, the distance sensors mounted on applicator 1400 should provide an estimate for φ that will result in better than ¼-½ mil accuracy in estimating d·sin φ. This determination will typically entail smoothing φ over short time intervals, for example, about 0.1 Hz, which is easily done if the distance sensors sampling rates are high enough.

At a 1 Hz oscillation in φ from 0°-0.73°, a sampling rate of 100 Hz or greater will provide enough data for incoherent smoothing in near real time to compensate for zero-mean motion induced errors.

Figure 17:
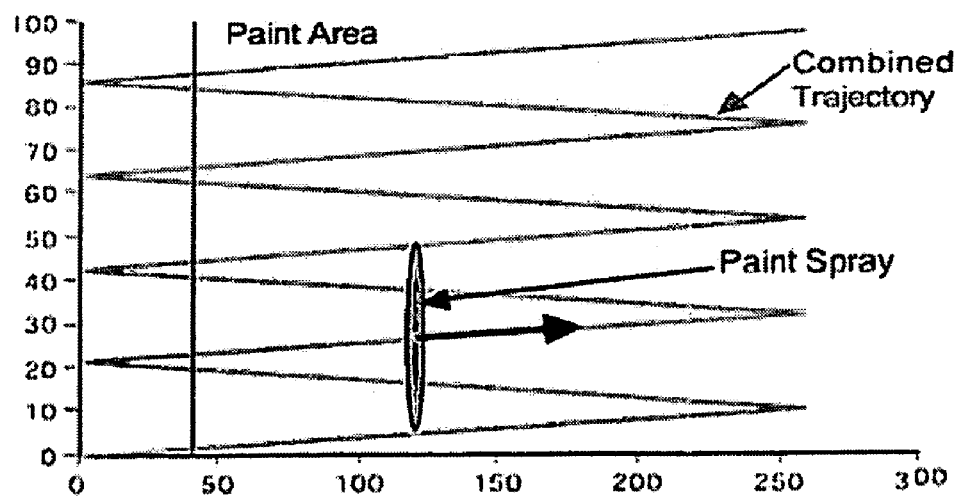

The velocity of the spray head is assumed to be constant when computing the time delay for sensor A data cache. For a coating applicator (1400) that follows a zigzag path as shown in FIG. 17, this is believed to be a reasonable assumption because most of the velocity variation occurs outside the paint area. If necessary, the thickness measurement system can communicate with the coating applicator system to obtain its velocity estimate, then compute a more accurate delay value as follows:

$$\text{Expected Value Time Delay} = \int_{\Delta t}(d\cdot\cos\phi/v)dt/\int_{\Delta t}dt \quad (7)$$

Figure 18:
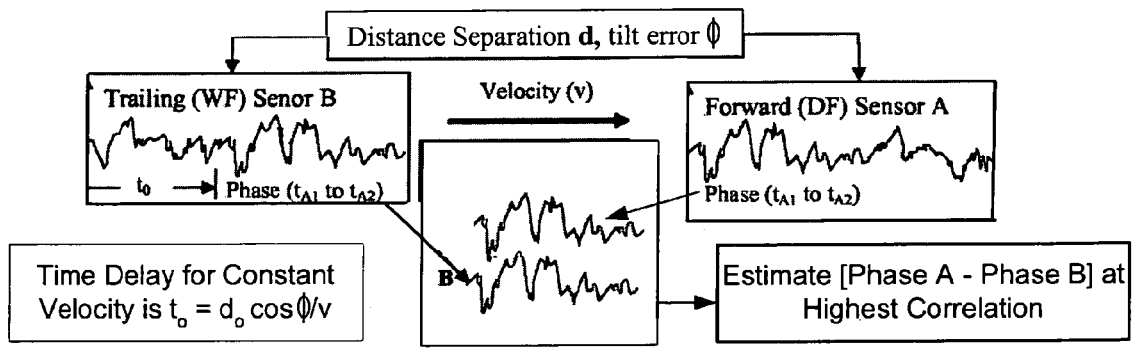
FIG. 18 shows a procedure for correlating the readings of the two sensors of the measurement system shown in FIG. 14.

This delay can be used to more accurately match the outputs of Sensor A and Sensor B in processing in a manner described in FIG. 18. In practice one can set a correlation window length based on the error in estimating the time delay, and the correlation can be computed for a number of time shifts within this $t_0 \pm \Delta$ window. The final estimate of the difference in the thickness function of the two sensors is made as the correlation peaks. This algorithm is relatively simple to implement digitally and pre-programmed correlation routines are available that rapidly perform this type of correlation algorithm A consideration in determining phase or other response differences between the two sensors is ensuring that they both passed over the same point at different times. The steel substrate in some important applications is characterized as having a typical sand-blast profile of ±2.5 mils. If Sensor B sees a different part of the structure than Sensor A, the resulting additive systematic error can be significant. One method to ensure that both sensors measure the same point when the applicator follows the zigzag trajectory of FIG. 17 is to mount the sensor arm on a rotational actuator that aligns with the velocity vector of the coating applicator.

Figure 19A:
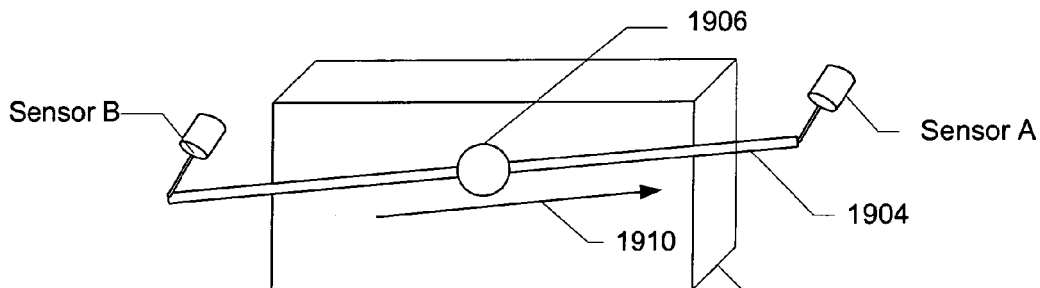
FIGS. 19A and 19B show an embodiment of a measurement system in which the sensors are mounted on an arm that rotates to maintain the sensors in a line parallel to the direction of motion of the paint applicator.
Figure 19B:
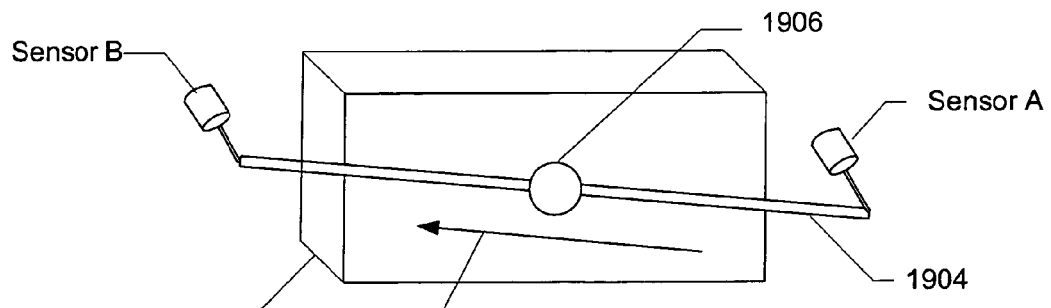

FIGS. 19A and 19B show a coating applicator 1902 in which Sensors A and Sensor B are mounted on an arm 1904 that is attached to a rotator 1906, such as a stepper motor, that changes the angle of an arm 1904 so that it is parallel to the velocity 1910 of applicator 1902. FIG. 19A shows the angle of arm 1904 when the applicator 1902 is moving in a first direction in the zigzag motion of FIG. 17, and FIG. 19B shows the angle of the arm 1904 when the applicator 1902 is moving in a second direction of the zigzag motion.

In some embodiments, one can use a single sensor on a paint applicator and first scan the structure to be painted on a "dry run," that is, without applying paint, to collect and store data about the wave reflected from the pre-existing layers. The paint applicator is then scanned over the structure again following the same path, applying paint and measuring the wet film. The before and after coating measurement are compared as described above to determine a wet file thickness.

Relative motion of the spray head to the structure being coated is intended to include not only a moving paint applicator and a fixed part, but also a moving part and a fixed applicator. While the invention is shown with a microwave transceiver directing microwaves essentially normal to the target surface, the invention could be implemented with a separate microwave transmitter and received, with non-normal angles of incidence and reflection.

Some embodiments are suitable for measuring thicknesses of coating that contain large amounts of metals. For example, coatings that include eighty percent zinc or cuprous oxides, can still have dielectric properties that permit these measurements. Examples of typical materials for which the present invention can be used include high solids zinc-based anti corrosion paints, high solids copper based anti-fouling paints, silicone alkyd paints, and epoxy based aircraft paints. The term "paint" as used herein includes any type of coating, including, but not limited to conventional paints, high metallic content coating, and polymer coatings, such as appliqués. The term "curve" is used to indicate a relationship between variables, and is not limited to a line plotted on a graph, but can include a table, formula, or other method of expressing the relationship. The term "quadrant component" or "Q" refers to a component that is shifted ninety degrees from a reference signal, typically the primary signal, whereas the plural term "quadrant components" typically refers to the set of in-phase and ninety degree shifted component.

The invention is not limited to any specific radiation frequency and can use, for example, K band or X band microwaves. While some embodiments of the invention can be implemented with standard, off the shelf microwave components, a preferred embodiment for wet film thickness measurement uses an X-band microwave transceiver mounted directly to a machined horn antenna, with a daughter board that provides signal conditioning and includes isolation coils to protect the transceiver diodes from electrostatic damage. The transceiver typically provides two low power outputs corresponding to I and Q, providing the daughter board on the sensor unit reduces the lead length of the output, which reduces system noise.

When the inventors use the term "or" herein, it is not intended to be an "exclusive or," unless that is made clear from the context. For example, when applicants say an embodiment can measure DFT or WFT, that embodiment is capable of performing both measurements.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. An apparatus for determining the thickness of a film on a substrate comprising:
   a first sensor including a microwave transmitter for producing a primary microwave energy, a waveguide for directing said primary microwave energy towards a target, a reflected energy separator to separate microwave energy reflected from the target and direct the reflected energy along a different path, and a detector for receiving only separated microwave energy reflected off said target;
   an analyzer for determining the thickness of the film on a substrate, the analyzer programmed to carry out the steps of
   (i) measuring the in-phase and quadrature components of the reflected microwave energy;
   (ii) comparing the measured components to stored data; and
   (iii) determining a thickness value of the film;
   (iv) determining the phase angle of the reflected wave from the in-phase and quadrature components of the reflected microwave energy; and
   an indicator for providing results of the determination.

2. The apparatus of claim 1 in which the stored data is stored calibration data obtained from previous measurements of calibration films of known thicknesses.

3. The apparatus of claim 2 in which the stored calibration data is obtained from previous measurements of calibration films of known thicknesses made from the same material as the film to be measured and coated over the same material as the substrate.

4. The apparatus of claim 2 in which the stored calibration data is obtained by:
   directing primary microwave energy from a microwave sources toward a series of known thickness calibration targets, each thickness calibration target including a film on a calibration substrate;
   receiving reflected microwave energy returned from said thickness calibration targets;
   measuring said reflected microwave energy to determine one or more measured components of the reflected microwave energy; and
   determining and storing a relationship between the measured component of the reflected microwave energy and the film thickness.

5. The apparatus of claim 1 in which the reflected energy separator comprises a three-port circulator that separates the path of the reflected microwave energy from the path of the transmitted microwave energy.

6. The apparatus of claim 1 in which determining a film thickness includes determining a phase angle of the reflected wave and the determining the thickness from the phase angle by comparing the phase angle with a predetermined relationship between phase angle and film thickness, the predetermined relationship having been derived from measurements of calibration films of known thicknesses.

7. The apparatus of claim 1 in which determining a thickness value of the film includes eliminating the effect of the distance between the microwave transmitter and the substrate on the reflected microwave energy.

8. An apparatus for determining the thickness of a film on a substrate comprising:
- a first sensor including a microwave transmitter for producing a primary microwave energy, a waveguide for directing said primary microwave energy towards a target, a reflected energy separator to separate microwave energy reflected from the target and direct the reflected energy along a different path, and a detector for receiving only separated microwave energy reflected off said target;
- an analyzer for determining the thickness of the film on a substrate, the analyzer programmed to carry out the steps of
  - (i) measuring components of the reflected microwave energy;
  - (ii) comparing the measured components to stored data; and
  - (iii) determining a thickness value of the film;
- an indicator for providing results of the determination;
- a coating applicator providing motion relative to a substrate and having a coating outlet for applying a wet film to the substrate during the period of relative motion; and
- a second sensor associated with the coating applicator and preceding the coating outlet in the direction of relative motion, the second sensor providing a measurement characteristic of the surface to be coated; and
- in which the first sensor is also associated with the coating applicator but is following the coating outlet in the direction of relative motion, the first sensor providing a measurement characteristic of the surface to be coated and the applied wet film.

9. The apparatus of claim 8 in which the measurement characteristic provided by the second sensor is stored and compared to the measurement characteristic provided by the first sensor and in which a thickness value of the newly applied film is determined by the difference in measurements of the two sensors.

10. The apparatus of claim 8 in which the stored data is stored calibration data obtained from previous measurements of calibration films of known thicknesses and in which a thickness value of the film is determined by the difference in measurements of the two sensors and by comparing the measurement characteristics provided by the sensors with the stored calibration data.

11. A method of determining thickness of a film on a substrate, comprising:
- directing primary microwave energy from a microwave transmitter toward a film of unknown thickness on a substrate located at a distance from the transmitter;
- receiving reflected microwave energy returned from the substrate as affected by the film;
- measuring components of the reflected microwave energy; and
- determining, from the effect of the film on the reflected microwave energy, while eliminating the effect of the distance between the microwave transmitter and the substrate on the reflected microwave energy, a thickness value of the film from the components of the reflected microwave energy using a stored relationship between the properties of reflected microwave energy and thicknesses of films, the stored relationship being obtained from previous measurements of calibration films of known thicknesses;
- in which directing primary microwave energy toward a film on a substrate includes moving a microwave transmitter parallel to the surface of the substrate as part of a robotic or automatic coating application system, and measuring a thickness of the film by employing two sensors, one microwave sensor over the substrate surface with coating of film applied and another sensor over the substrate surface without coating of film applied, and determining the difference in measurements of the two sensors.

12. The method of claim 11, further comprising:
- separating the path of the reflected microwave energy from the path of the primary microwave energy so that the reflected wave can be measured directly without measuring a standing wave resulting from the primary and reflected microwave energy.

13. The method of claim 11 further comprising determining the predetermined relationship by directing microwaves toward calibration films of known thicknesses and measuring one or more of the amplitude, phase shift, in-phase component, or quadrature component of the reflected microwave energy.

14. The method of claim 13 in which the predetermined relationship includes determining a relationship describing thickness as a function of an in-phase component and a quadrature component.

15. The method of claim 14 in which the predetermined relationship is one that is characterizable as a spiral on a graph showing film thickness plotted against in-phase component on one axis and quadrature component.

16. The method of claim 14 in which the predetermined relationship is one that is characterizable as a parabola on a graph showing film thickness plotted against shift in phase between the primary wave and the reflected wave.

17. The method of claim 14 in which the predetermined relationship is characterizable as a damped periodic function on a graph showing film thickness plotted against the in-phase component or the quadrature component of the reflected wave.

18. The method of claim 14 in which the predetermined relationship is stored as a table.

19. The method of claim 14 in which the predetermined relationship is stored as one or more mathematical expressions.

* * * * *